United States Patent
Chung et al.

(10) Patent No.: US 12,209,867 B2
(45) Date of Patent: Jan. 28, 2025

(54) SPHERICAL MULTI-AXIS OPTICAL FIBER SENSING DEVICE, ASSEMBLING METHOD AND MOVABLE DEVICE

(71) Applicant: NATIONAL CENTRAL UNIVERSITY, Taoyuan (TW)

(72) Inventors: Hung-Pin Chung, Kaohsiung (TW); Ching-Lu Hsieh, New Taipei (TW); Sheng-Han Chang, Chiayi (TW); Chii-Chang Chen, Taoyuan (TW); Yen-Hung Chen, Taoyuan (TW); Jann-Yenq Liu, Taipei (TW)

(73) Assignee: AEGIVERSE CO., LTD, Taoyuan (TW)

( * ) Notice: Subject to any disclaimer, the term of this patent is extended or adjusted under 35 U.S.C. 154(b) by 287 days.

(21) Appl. No.: 17/883,454

(22) Filed: Aug. 8, 2022

(65) Prior Publication Data
US 2023/0384098 A1     Nov. 30, 2023

(30) Foreign Application Priority Data

May 30, 2022   (TW) .................................. 111120082

(51) Int. Cl.
*G01C 19/72*     (2006.01)
(52) U.S. Cl.
CPC ......... *G01C 19/722* (2013.01); *G01C 19/728* (2013.01)
(58) Field of Classification Search
CPC .... G01C 19/72; G01C 19/721; G01C 19/722; G01C 19/728
See application file for complete search history.

(56) References Cited

U.S. PATENT DOCUMENTS

| | | | | |
|---|---|---|---|---|
| 4,815,853 | A * | 3/1989 | Lefevre ................ | G01C 19/728 356/462 |
| 6,038,025 | A * | 3/2000 | Weed ................... | G01C 19/722 356/460 |
| 6,198,094 | B1 * | 3/2001 | Freier .................. | G01C 19/728 250/231.12 |

(Continued)

FOREIGN PATENT DOCUMENTS

| CN | 105424039 A | 3/2016 |
|---|---|---|
| CN | 106123883 A | 11/2016 |

(Continued)

OTHER PUBLICATIONS

English translation of CN 105424039. Obtained from Espacenet on Sep. 17, 2024. (Year: 2024).*

(Continued)

*Primary Examiner* — Michael A Lyons
(74) *Attorney, Agent, or Firm* — Muncy, Geissler, Olds & Lowe, P.C.

(57) ABSTRACT

A spherical multi-axis optical fiber sensing device is formed by a three-axis optical interference sensor composed of a multi-level opto-mechanical integrated unit kit. The opto-mechanical integrated unit kit is composed of three fiber rings, which are respectively a large fiber ring, a medium fiber ring and a small fiber ring. The multi-level opto-mechanical integrated unit kit is combined with the use of the mechanism component technology that can be freely rotated and positioned to achieve the functional purpose of establishing a three-axis orthogonal optical fiber sensing unit in a single sphere volume.

20 Claims, 6 Drawing Sheets

(56) References Cited

U.S. PATENT DOCUMENTS

| | | |
|---|---|---|
| 8,773,665 B1 | 7/2014 | Logan et al. |
| 8,823,946 B1 | 9/2014 | Logan et al. |
| 11,047,687 B2 | 6/2021 | Feke |
| 2010/0079766 A1* | 4/2010 | Justin .................. G01C 19/728 |
| | | 356/465 |
| 2019/0233039 A1 | 8/2019 | Krylatov |

FOREIGN PATENT DOCUMENTS

| | | | |
|---|---|---|---|
| CN | 108036801 B | 5/2020 | |
| EP | 349961 A * | 1/1990 | ........... G01C 19/728 |
| EP | 0349961 A2 | 1/1990 | |
| EP | 2239540 B1 | 3/2012 | |
| JP | 2005010027 A | 1/2005 | |
| JP | 2019120592 A | 7/2019 | |
| TW | I719888 B | 2/2021 | |
| TW | I752831 B | 1/2022 | |

OTHER PUBLICATIONS

Gilmore, J.P. et al. "Three-axis nested fiber optic gyroscope". IEEE 2000. Position Location and Navigation Symposium. 2000, pp. 411-418. (Year: 2000).*

Office Action with appended search report for corresponding Taiwanese Application No. 111120082 issued on Oct. 19, 2022.

\* cited by examiner

SPHERICAL MULTI-AXIS OPTICAL FIBER SENSING DEVICE, ASSEMBLING METHOD AND MOVABLE DEVICE

TECHNICAL FIELD

The present disclosure relates to a spherical multi-axis optical fiber sensing device, an assembling method of the spherical multi-axis optical fiber sensing device and a movable device using the spherical multi-axis optical fiber sensing device, and particularly to the spherical multi-axis optical fiber sensing device, the assembling method and the movable device, wherein the three-axis fiber rings of them are packaged by using a three-axis concentric package manner, and the required volume can be effectively reduced.

RELATED ART

Fiber optic gyroscopes can be used in unmanned aerial vehicles, helicopters, small civilian aircrafts, etc., as the main navigation system. In addition, with the frequent marine activities of various countries, a huge number of various ships are required. The advantages of high reliability and long life of fiber optic gyroscopes are also very suitable for ship navigation. Fiber optic gyroscopes can also be used in the field of civilian robotics. Civilian robots are an emerging industry, which also need to control their orientation and attitude, and the characteristics of the small sizes, light weights and low costs of the fiber optic gyroscopes are just in line with the requirements of robots. In addition, mine mining, oil well surveying, oil exploration, ground vehicle navigation, civil engineering surveying and tunnel excavation require a large number of surveying and measuring systems, so it also brings unlimited business opportunities to the fiber optic gyroscope products.

The conventional fiber optic gyroscopes can measure the wide dynamic range of different rotational speeds, and have the characteristics of high sensitivity and low homodyne offset simultaneously. The fiber optic gyroscope is mainly composed of fiber rings, a logic circuit unit, a phase modulation unit, a light source and a detector. As disclosed in U.S. Pat. No. 8,773,665 B1, the light source and the detector can be completed by a single package, and the phase modulation unit and the fiber rings are independent from the single package. Although the light source and the detector can be completed by a single package, as disclosed in FIG. 6 of U.S. Pat. No. 8,773,665 B1, the maximum area of the fiber optic gyroscope module is determined by the physical size area of the fiber rings and the phase modulation unit. Therefore, if a miniature multi-axis fiber optic gyroscope is needed to be built, in addition to using the integrated light source and detector in a single package, the single integration of the multi-axis fiber rings and the multi-axis phase modulation unit is one necessary condition which must also be considered at the same time.

Due to the history of technology development, multi-axis fiber optic gyroscopes are mostly formed by single-axis fiber optic sensors. Therefore, in order to miniaturize the core phase modulation unit in the fiber optic gyroscope, the single optoelectronic packages can be used separately to achieve the purpose of integrating multi-axis optoelectronic phase modulators. However, in order to achieve the functional purpose of sensing three independent axes, the fiber rings of the multiple axes need to be orthogonal to each other. As disclosed in FIG. 1 of U.S. Pat. No. 11,047,687 B2, though the multi-axis optoelectronic phase modulator is integrated into a single component by using a phase modulation chip unit integrated in a single optoelectronic package, the physical volume of the overall multi-axis fiber optic gyroscope is still limited by the fiber rings. In other words, the multi-axis fiber optic gyroscope of the above technical solution still has the technical problem that the volume is too large, and the fiber optic gyroscope cannot be miniaturized.

In order to further reduce the volume of the three-axis fiber optic gyroscope, according to the disclosure of FIG. 22 of the EP Publication No. 0349961 A2, the publication utilizes the way of winding the three-axis fibers in the outside to achieve the reduction of the physical volume of the three-axis fiber optic gyroscope instrument. The assembly scheme in the publication is to first package the internal photoelectric element and the phase modulation chip unit, and then wrap three sets of orthogonal optical fiber rings on the outside. It is just unfortunate that when actually applying the fiber rings for measurement in the environment of variable temperature, it is necessary to consider the multi-axis symmetrical winding method, such as the four-axis and eight-axis symmetrical winding schemes, so as to reduce the wrong phase accumulation of the optical fiber due to different temperature-changing environments. Therefore, if the optoelectronic components have been packaged first, then the optical fiber winding machine is used to wrap the optoelectronic packaging unit into the axis center of the three-axis of the fiber rings. At this time, the optical fiber winding can basically only adopt the simple winding method. If the multi-axis symmetric scheme is selected, events such as twisting, entanglement or dislocation of the optical fibers will occur, and the axis centers of the optical fibers are difficult to be concentric, so that the sensing units of the axes cannot be orthogonal to each other and there is a mutual projection angle, which makes the multi-axis sensing unit virtually unable to obtain the three-axis independent test information. This instead increases the logical complexity how the backend parses the independent information of each axis. In short, the assembly solution provided the EP Publication No. 0349961 A2 is practically infeasible in the mass production optical fiber winding method.

If a multi-axis symmetric optical fiber winding method is selected, as disclosed in JP Publication No. 2005-10027A, in each layer of optical fiber winding, the step of coating the optical glue and the thickness of the optical glue is quite important. Since most of the optical adhesives of fiber rings are cured by ultraviolet radiation, the irradiation time and dwell curing time between layers in the fiber ring require special process design to avoid optical fiber dislocation, jumper and entanglement between layers, all of which affect the yield rate. In order to avoid the above-mentioned problems, JP Publication No. 2019-120592A proposes to utilize the design of the optical fiber ring winding bearing support, and after first completing the optical fiber winding, the uniaxial photoelectric unit is installed inside the optical fiber ring. The manner can reduce the thickness of the single-axis fiber optic sensor, but if the three mutually orthogonal multi-axis fiber optic sensors are built using this mechanism layout, the technical problem of the bulky finished product will still be faced.

On the other hand, U.S. Pat. No. 8,823,946 B1 discloses three-axis independent fiber rings and three sets of independent phase sensors. This technical solution utilizes the advantages of combining a single light source and a detector with a multiplexer. Since only the light source and the detector are a single component, the other phase sensors and the fiber rings are independent units. Therefore, the multi-axis fiber winding method can be used separately and independently instead of directly winding the fiber rings to the outside of a single packaged optoelectronic component. However, this U.S. Pat. No. 8,823,946 B1 does not illustrate how to further integrate the three-axis independent fiber rings and the three-axis independent phase sensors, so there is still a technical problem that the finished product is bulky and even cannot be carried out.

In addition, in order to reduce the difficulty of single integration of multi-axis optoelectronic components, both of TW Patent No. I719888B and TW Patent No. I752831B disclose the use of a single optoelectronic and optical fiber component to carry out reciprocal design and the chip packaging to achieve the completion of packaging the phase modulator and the light splitting unit in a single optoelectronic package. The technical solutions of the above two TW patents are more compatible with the concept of integrating multiple sets of phase modulation units, so the problem of bulky size of the multi-axis gyroscope photoelectric transceiver module caused by the separate packaging and reassembly of multiple sets of phase modulation units is basically solved. However, even if the technical problem of the bulky finished product is solved, there is still a technical problem that the three-axis fiber ring needs to accurately achieve three-axis concentricity and mutual orthogonality to minimize the sensing error.

SUMMARY OF THE PRESENT DISCLOSURE

An exemplary embodiment of the present disclosure provides a spherical multi-axis optical fiber sensing device, comprising: a first fiber ring; a first fixing frame, having a ring portion being surrounded and contacted by the first fiber ring for fixing the first fiber ring outside the first fixing frame; a second fixing frame, having a ring portion which has a plurality of fixing holes used for receiving a plurality of bearing portions of the first fixing frame, so as to fix the first fixing frame within the second fixing frame, wherein the ring portion of the first fixing frame is connected to the bearing portions of the first fixing frame; a second fiber ring, surrounding and contacting the ring portion of the second fixing frame, so as to be fixed outside the second fixing frame; a third fixing frame, having a ring portion which has a plurality of fixing holes used for receiving a plurality of bearing portions of the second fixing frame, so as to fix the second fixing frame within the third fixing frame, wherein the ring portion of the second fixing frame is connected to the bearing portions of the second fixing frame; and a third fiber ring, surrounding and contacting the ring portion of the third fixing frame, so as to be fixed outside the third fixing frame.

According to the above spherical multi-axis optical fiber sensing device, three centers of the first fiber ring, the second fiber ring and the third fiber ring are concentric with each other, and three normal lines of the first fiber ring, the second fiber ring and the third fiber ring are perpendicular to each other.

According to the above spherical multi-axis optical fiber sensing device, the spherical multi-axis optical fiber sensing device further comprises: a transceiver module, surrounded and contacted by a plurality of frame sides of the first fixing frame, so as to be fixed within the first fixing frame, wherein the frame sides of the first fixing frame are connected to the ring portion of the first fixing frame, and the bearing portions of the first fixing frame extend outwardly from the frame sides.

According to the above spherical multi-axis optical fiber sensing device, a first axial line of the bearing portions of the first fixing frame is parallel to the normal line of the first fiber ring, and a second axial line of the bearing portions of the second fixing frame is parallel to the normal line of the second fiber ring.

According to the above spherical multi-axis optical fiber sensing device, the transceiver module comprises a light integration unit, a light source, a detector and a logic circuit unit, wherein the logic circuit unit comprises an analog-to-digital chip unit, a digital logic operation chip, a field programmable gate array chip, a digital-to-analog chip unit and/or a hardware filter, and the light integration unit comprises an electro-optic phase modulation chip unit, an optical beam splitting unit, an optical waveguide light combining unit and/or a light polarization filter unit.

According to the above spherical multi-axis optical fiber sensing device, the first fixing frame is formed by two corresponding first fixing frame components, the second fixing frame is formed by two corresponding second fixing frame components, and the third fixing frame is formed by two corresponding third fixing frame components.

According to the above spherical multi-axis optical fiber sensing device, each of the first fixing frame components comprises a half ring portion, a plurality of frame sides and a bearing portion, one of the first fixing frame components further comprises at least one alignment bump, and other one of the first fixing frame components further comprises at least one alignment hole corresponding to the alignment bump, wherein the half ring portions form the ring portion of the first fixing frame, the alignment bump is formed on corresponding one of the half ring portions, and the alignment hole is formed on other corresponding one of the half ring portions, the frame sides of each of the first fixing frame components are connected to two ends of the corresponding half ring portion, and each of the bearing portions extends outward from one end of the corresponding one frame side, wherein two extending directions which the bearing portions extending outward are opposite and parallel to each other.

According to the above spherical multi-axis optical fiber sensing device, each of the second fixing frame components comprises a half ring portion, a plurality of frame sides, a bearing portion and a plurality of half fixing holes, one of the second fixing frame components further comprises at least one alignment bump, and other one of the second fixing frame components further comprises at least one alignment hole corresponding to the alignment bump, and the half fixing holes of one of the second fixing frame components and the half fixing holes of other one of the second fixing frame components correspond to each other to form the fixing holes of the second fixing frame, wherein the half ring portions form the ring portion of the second fixing frame, the alignment bump is formed on corresponding one of the half ring portions, and the alignment hole is formed on other corresponding one of the half ring portions, the frame sides of each of the second fixing frame components are connected to two ends of the corresponding half ring portion, and each of the bearing portions extends outward from one end of the corresponding one frame side, wherein two extending directions which the bearing portions extending outward are opposite and parallel to each other.

According to the above spherical multi-axis optical fiber sensing device, each of the third fixing frame components is annular, one of the third fixing frame components is formed with the fixing holes of the third fixing frame, the third fixing frame components are formed with the ring portion of the third fixing frame, one of the third fixing frame components further comprises at least one alignment bump, and other one of the third fixing frame components further comprises at least one alignment hole corresponding to the alignment bump.

An exemplary embodiment of the present disclosure provides a movable device, comprising: a movable part, making the movable device move and/or rotate; the above mentioned spherical multi-axis optical fiber sensing device, disposed in the movable device, used to sense a motion signal of multiple axes; and a control unit, signally connected to the spherical multi-axis optical fiber sensing device for receiving the motion signal, so as to control movement and/or rotation of the movable part.

An exemplary embodiment of the present disclosure provides an assembling method of a spherical multi-axis optical fiber sensing device, comprising: making two first fixing frame components move face by face to be sleeved in a first fiber ring, such that the first fixing frame components form a first fixing frame, wherein a ring portion of the first fixing frame is surrounded and contacted by the first fiber ring, so as to fix the first fiber ring outside the first fixing frame; making an assembly assembled by the first fiber ring and the first fixing frame be disposed in a second fiber ring, and making a normal line direction of the first fiber ring be perpendicular to a normal line direction of the second fiber ring, making two second fixing frame components move face by face to be sleeved in the second fiber ring, such that the second fixing frame components form a second fixing frame, wherein a plurality of fixing holes of a ring portion of the second fixing frame is used to receive a plurality of bearing portions of the first fixing frame, such that the first fixing frame is fixed in the second fixing frame, the ring portion of the first fixing frame is connected to the bearing portions of the first fixing frame, and the second fiber ring surrounds and contacts the ring portion of the second fixing frame, so as to fix the second fiber ring outside the second fixing frame; and making an assembly assembled by the first fiber ring, the first fixing frame, the second fiber ring and the second fixing frame be disposed in a third fiber ring, making a normal line direction of the third fiber ring be perpendicular to the normal line direction of the first fiber ring and the normal line direction of the second fiber ring, making two third fixing frame components move face by face to be sleeved in the third fiber ring, such that the third fixing frame components form a third fixing frame, wherein a ring portion of the third fixing frame is surrounded and contacted by the third fiber ring, so as to fix the third fiber ring outside the third fixing frame.

According to the above assembling method, the assembling method further comprises: making a transceiver module be surrounded and contacted by a plurality of frame sides of the first fixing frame, so as to fix the transceiver module within the first fixing frame, wherein the frame sides of the first fixing frame are connected to the ring portion of the first fixing frame.

To sum up, a main objective of the present disclosure is to provide a high integration solution to integrate a three-axis orthogonal optical fiber sensing unit into a single sphere volume, such that the functional purpose of directly using three uniaxial fiber rings to be placed in a specific structure can be achieved, the functional purpose of the three axial fiber rings being orthogonal to each other can be also achieved, and the core transceiver module with optoelectronic components can be installed in a position where the three axis centers of the three fiber rings are concentric with each other. Compared with the existing multi-axis solution of the fiber optic gyroscopes, which is an optical fiber sensor formed by three independent single-axis components, the present disclosure can directly integrate the three-axis fiber rings into a spherical multi-axis optical fiber sensing device, thereby greatly reducing the volume and the sensor weight, and realizing the functional purpose of detecting three-axis optical fiber sensing by a single spherical multi-axis optical fiber sensing device.

To sum up, compared with the prior art, the embodiment of the present disclosure provides a power noise suppression circuit for the noise-sensitive machine equipment, which dynamically monitors the noise component of the supply voltage, and controls the output power voltage accordingly, so as to ensure that the output power voltage has low noise and is stable.

BRIEF DESCRIPTIONS OF DRAWINGS

The present disclosure can be more fully understood by reading the subsequent detailed description and examples with references made to the accompanying drawings, wherein dimensions and arrangement configurations in the drawings are for illustration only, and the present disclosure is not limited thereto. Each figure of the drawings is briefly illustrated as follows.

DETAILS OF EXEMPLARY EMBODIMENTS

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

In view of the technical problems existing in the prior art, an embodiment of the present disclosure provides a spherical multi-axis optical fiber sensing device, which is formed by a three-axis optical fiber interference sensor being composed of a multi-level opto-mechanical integrated unit kit. The multi-level opto-mechanical integrated unit kit is composed of three fiber rings, which are respectively a large fiber ring, a medium fiber ring and a small fiber ring. The multi-level opto-mechanical integrated unit kit is combined with the use of the mechanism component technology that can be freely rotated and positioned to achieve the functional purpose of establishing a three-axis orthogonal optical fiber sensing unit in a single sphere volume. Specifically, the three-axis optical fiber interference sensor of the spherical multi-axis optical fiber sensing device comprises three fiber rings and an integrated transceiver module, wherein the three fiber rings are located at the outer, middle and inner parts of the spherical multi-axis optical fiber sensing device. The transceiver module is packaged in an array fiber optic package, and comprises multiple sets of integrated optical chip units, light sources, photoelectric detector units and control logic circuit units.

Compared with the current solution that the individual fiber rings are packaged independently, and then the fiber rings of different axes are assembled through the optical correction manner of the external complex three-axis concentric to form an orthogonal three-axis optical fiber sensing unit, according to the specially designed multi-level optomechanical integrated unit assembly scheme, the present disclosure uses the method of three-axis concentric packaging and the structure of the relative orthogonal relationship of the multi-level mechanism components, so that the three-axis fiber rings achieve the functional purpose of three-axis concentricity and mutual orthogonality at the same time, and the three-dimensional volume of the three-axis fiber rings are greatly reduced. Compared with the traditional three-axis independent components, the solution of the present disclosure is expected to reduce the volume of the finished product by 55% to 75%.

Refer to FIG. 1 through FIG. 5, and FIG. 1 through FIG. 5 are respectively a stereoscopic diagram, a front view schematic diagram, a side view schematic diagram, a top view schematic diagram and an exploded diagram of a spherical multi-axis optical fiber sensing device according to an embodiment of the present disclosure. The spherical multi-axis optical fiber sensing device 1 comprises fiber rings 101, 102, 103, fixing frames 104, 105, 106 and a transceiver module 107. Among the fiber rings 101, 102, 103, the dimension of the fiber ring 101 is the largest one, and the dimension of the fiber ring 103 is the smallest one. The ring portion (formed by two half ring portions 10512 and 10522) of the fixing frame 105 is surrounded and contacted by the fiber ring 103, such that the fiber ring 103 is fixed outside the fixing frame 105.

A ring portion (formed by two half ring portions 10412 and 10422) of the fixing frame 104 has a plurality of fixing holes (formed by two half fixing holes 10415, 10425) for receiving bearing portions 10514, 10524 of the fixing frame 105, such that the fixing frame 105 is fixed within the fixing frame 104, wherein the ring portion of the fixing frame 105 is connected to the bearing portions 10514, 10524 of the fixing frame 105 via a plurality of frame sides 10511, 10521. The fiber ring 102 surrounds and contacts the ring portion of the fixing frame 104, and thus, the fiber ring 102 is fixed outside the fixing frame 104. The fixing frame 105 is pivotally connected to the ring portion of the fixing frame 104 via the bearing portions 10514, 10524. When the fixing frame 105 rotates, it drives the fiber ring 103 to rotate.

The ring portion of the fixing frame 106 (composed of annular fixing frame components 1061, 1062) has a plurality of fixing holes 10612 for receiving a plurality of bearing portions 10414, 10424 of the fixing frame 104, so as to fix the fixing frame 104 within the fixing frame 106, wherein the ring portion of the fixing frame 104 is connected to the bearing portions 10414, 10424 of the fixing frame 104 via a plurality of frame sides 10411, 10421. The fiber ring 101 surrounds and contacts the ring portion of the fixing frame 106, such that the fiber ring 101 is fixed outside the fixing frame 106. The fixing frame 104 is pivotally connected to the ring portion of the fixing frame 106 via the bearing portions 10414, 10424. When the fixing frame 104 rotates, it drives the fiber ring 102 to rotate. Similarly, when the fixing frame 106 rotates, it drives the fiber ring 101 to rotate.

The transceiver module 107 is surrounded and contacted by the frame sides 10511, 10521 of the fixing frame 105, such that the transceiver module 107 is fixed within the fixing frame 105, wherein the frame sides 10511, 10521 of the fixing frame 105 are connected to the ring portion of the fixing frame 105. The bearing portions 10514, 10524 of the fixing frame 105 extend outwardly from the frame sides 10511, 10521. The transceiver module 107 is also signally connected to each of the fiber rings 101, 102, 103, so as to receive the optical signals of the fiber rings 101, 102, 103 and send the optical signals to the fiber rings 101, 102, 103, and obtain a motion signal of multiple axes.

Figure 1:
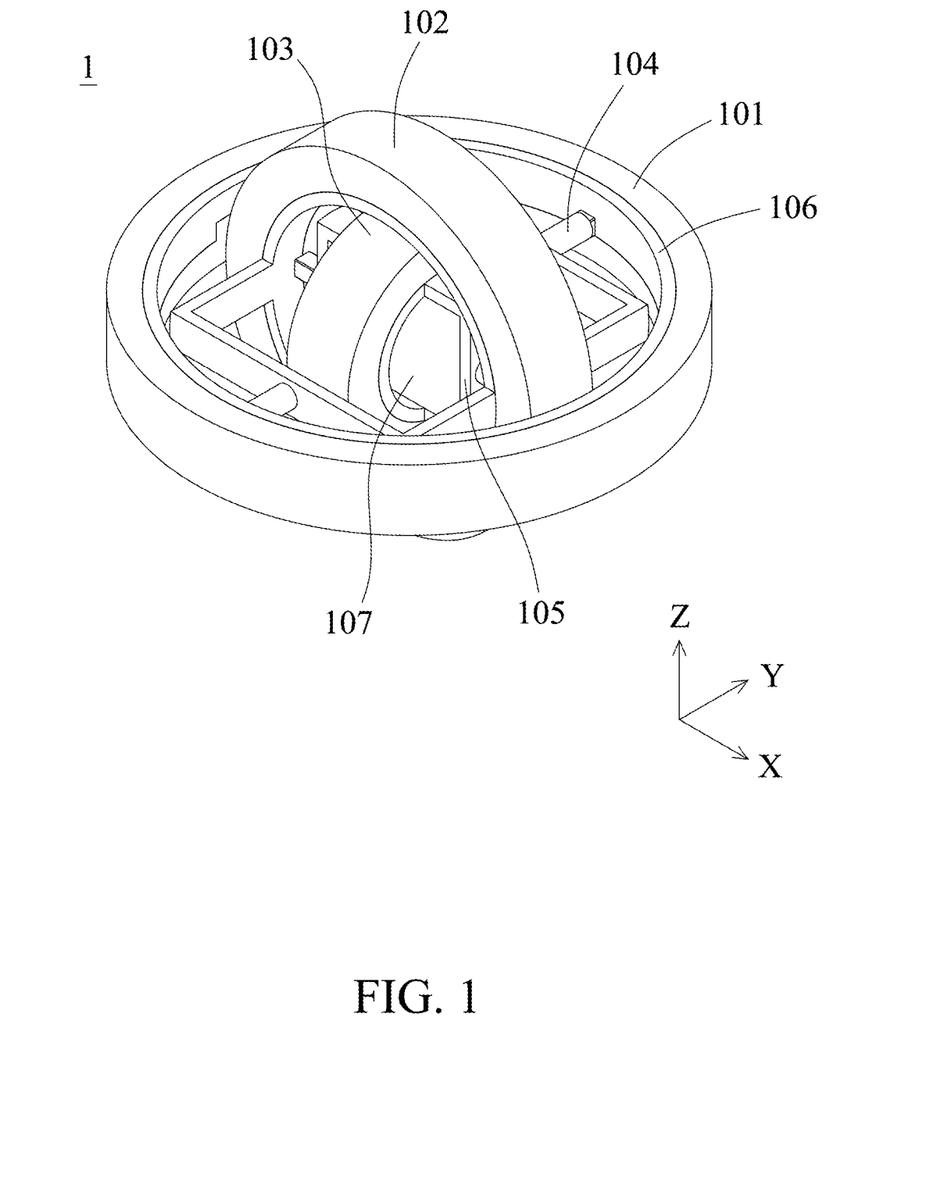
FIG. 1 is a stereoscopic diagram of a spherical multi-axis optical fiber sensing device according to an embodiment of the present disclosure.
Figure 2:
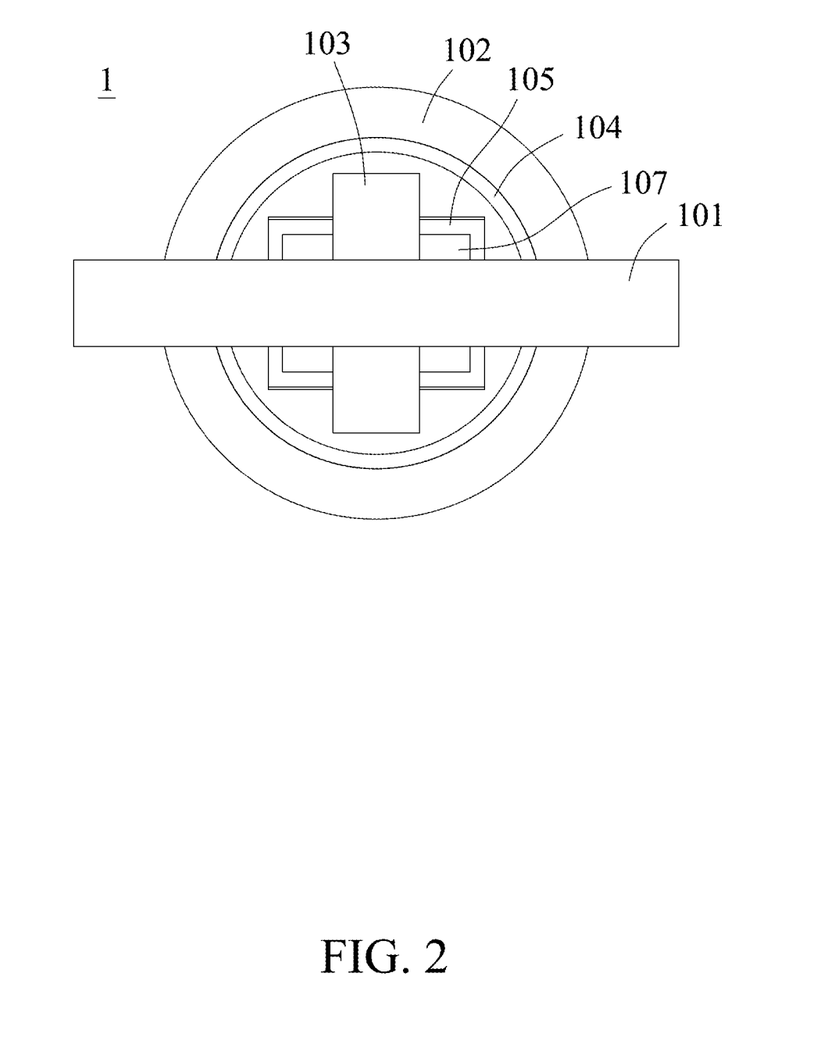
FIG. 2 is a front view schematic diagram of a spherical multi-axis optical fiber sensing device according to an embodiment of the present disclosure.
Figure 3:
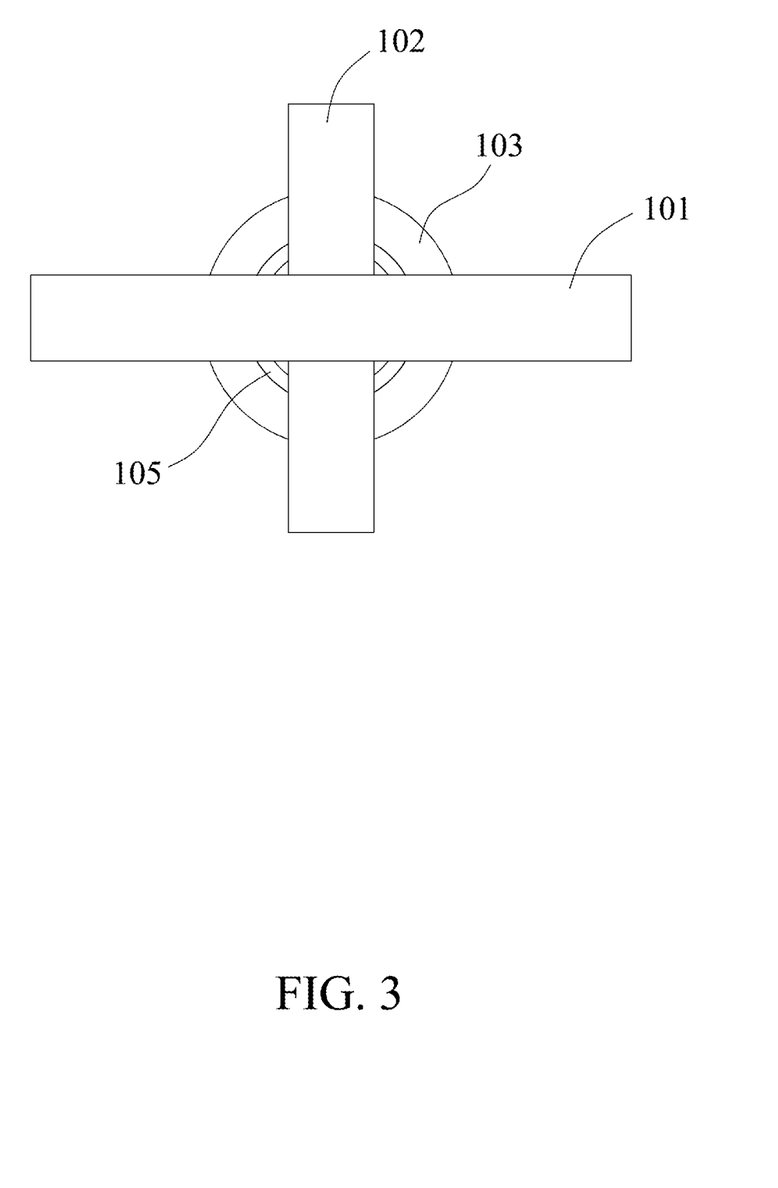
FIG. 3 is a side view schematic diagram of a spherical multi-axis optical fiber sensing device according to an embodiment of the present disclosure.
Figure 4:
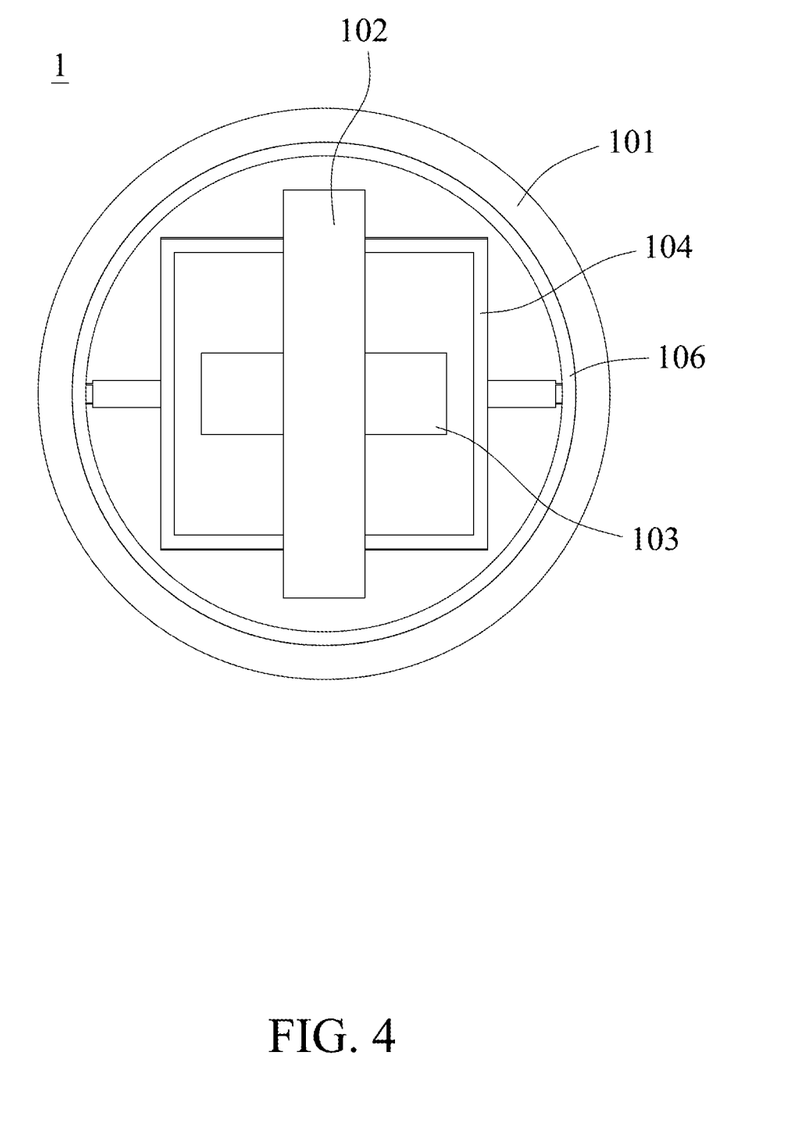
FIG. 4 is a top view schematic diagram of a spherical multi-axis optical fiber sensing device according to an embodiment of the present disclosure.
Figure 5:
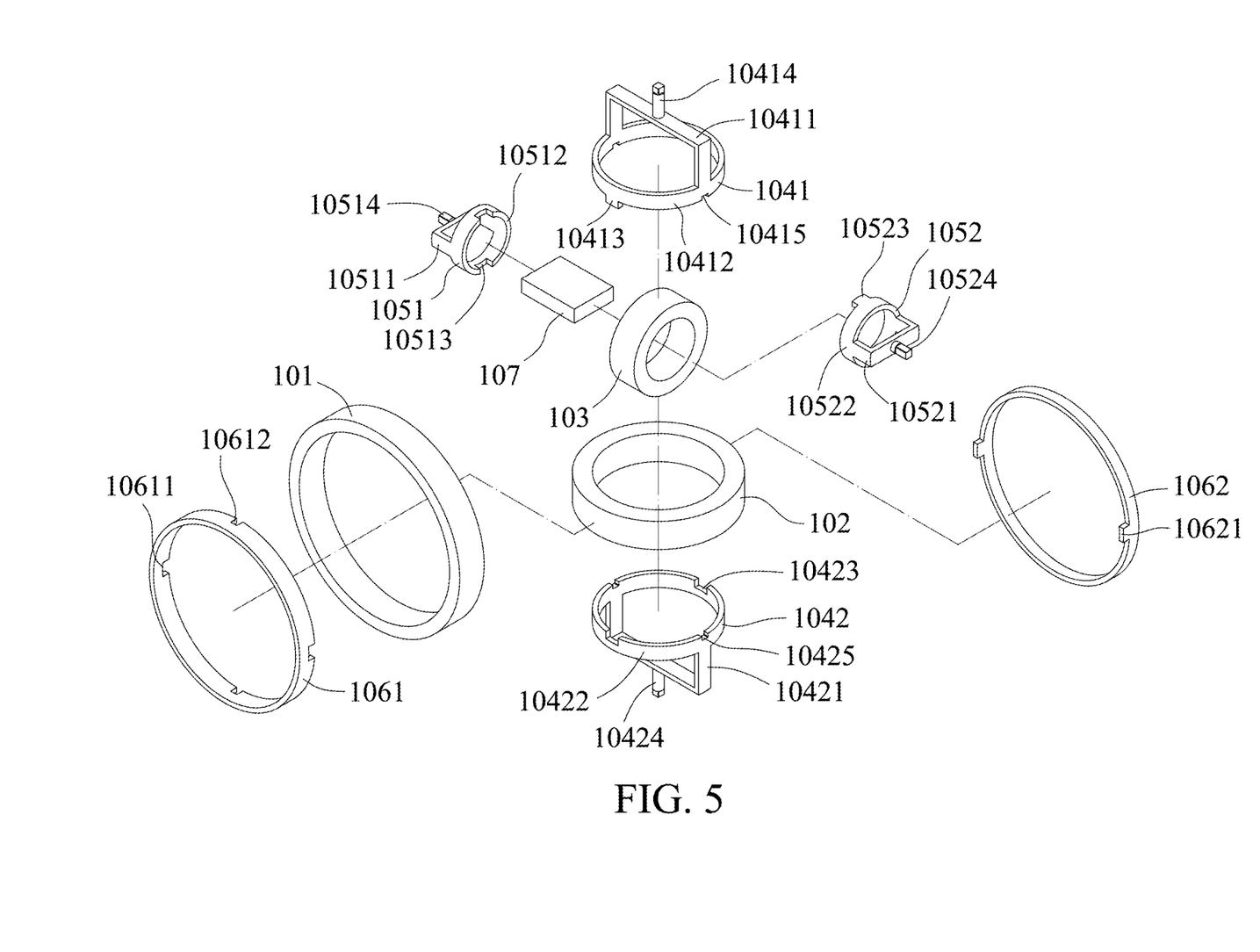
FIG. 5 is an exploded diagram of a spherical multi-axis optical fiber sensing device according to an embodiment of the present disclosure.

The transceiver module 107 comprises a light integration unit, a light source, a detector and a logic circuit unit, wherein the logic circuit unit comprises an analog-to-digital chip unit, a digital logic operation chip, a field programmable gate array chip, a digital-to-analog chip unit and/or a hardware filter, and the light integration unit comprises an electro-optic phase modulation chip unit, an optical beam splitting unit, an optical waveguide light combining unit and/or a light polarization filter unit. In short, the type and components of the transceiver module 107 are not used to limit the present disclosure.

It is noted that, the transceiver module 107 in the present disclosure is not a necessary component. Since the transceiver module 107 may be exchanged, the spherical multi-axis optical fiber sensing device 1 is designed to let the application-end factory to install the transceiver module 107 after the spherical multi-axis optical fiber sensing device 1 leaves the factory. The transceiver module 107 enter the space formed by the frame sides 10511, 10521 of the fixing frame 105 at a specific angle, and then flipped at another one specific angle to be fixed in the space formed by the frame sides 10511, 10521.

Refer to FIG. 1 and FIG. 5, the three centers of the fiber rings 101, 102, 103 are concentric with each other, and the three normal lines of the fiber rings 101, 102, 103 are perpendicular to each other (i.e., the fiber rings 101, 102, 103 are orthogonal to each other). From FIG. 1, it can be known that a normal line direction of the fiber ring 103 is a X axis direction, a normal line direction of the fiber ring 102 is a Y axis direction, and a normal line direction of the fiber ring 101 is a Z axis direction. In the present disclosure, the specific structure of the fixing frames 104, 105, 106 combined with the fiber rings 101, 102, 103 are utilized, so as to achieve the purpose that the three centers of the fiber rings 101, 102, 103 can be concentric with each other and the fiber rings 101, 102, 103 are orthogonal to each other.

The design of the above specific structure means that, after assembly, axial lines (parallel to the X axis) of the bearing portions 10514, 10524 of the fixing frame 105 are parallel to the normal line direction of the fiber ring 103, and axial lines (parallel to the Y axis) of the bearing portions 10414, 10424 of the fixing frame 104 are parallel to the normal line direction of the fiber ring 102, and a normal line direction of the plane formed by the ring portion of the fixing frame 104, a normal line direction of the plane formed by the ring portion of the fixing frame 105 and a normal line direction of the plane formed by the ring portion of the fixing frame 106 are also perpendicular to each other.

Referring to FIG. 1 and FIG. 5 particularly, in the present disclosure, the fixing frame 105 is composed of two corresponding fixing frame components 1051 and 1052, the fixing frame 104 is composed of two corresponding fixing frame components 1041 and 1042, and the fixing frame 106 is composed of two corresponding fixing frame components 1061 and 1062. In other embodiments, each of the fixing frames 104, 105, 106 may also be an integrally formed component, in short, the present disclosure is not limited thereto.

Each of the fixing frame components 1051, 1052 comprises the half ring portions 10512, 10522, the frame sides 10511, 10521 and the bearing portions 10514, 10524, the fixing frame component 1052 further comprises at least one alignment bump 10523, and the fixing frame components 1051 further comprises at least one alignment hole 10513 corresponding to the at least one alignment bump 10523, wherein the half ring portions 10512, 10522 form the ring portion of the fixing frame 105, and alignment bump 10523 is formed on the corresponding half ring portion 10522 while the alignment hole 10513 is formed on the corresponding half ring portion 10512. The frame sides 10511 are connected to the opposite two ends of the corresponding half ring portion 10512, and the frame sides 10521 are connected to the opposite two ends of the corresponding half ring portion 10522. The bearing portion 10514 extends outward from one end of the corresponding frame sides 10511, and the bearing portion 10524 extends outward from one end of the corresponding frame sides 10521, wherein two outward extending directions of the bearing portions 10514, 10524 are opposite and parallel to each other.

Further, the frame sides 10511 form a half rectangle, the two ends of the two opposite sides of the half rectangle are connected to the opposite ends of the corresponding half ring portion 10512, and the bearing portion 10514 is formed on the middle end of the other side of the half rectangle which is adjacent to the two opposite sides of the half rectangle. Similarly, the frame sides 10521 form a half rectangle, the two ends of the two opposite sides of the half rectangle are connected to the two ends of the corresponding half ring portion 10522, and the bearing portion 10524 is formed at the middle end of the other side of the half rectangle which is adjacent to the two opposite sides of the half rectangle. The frame sides 10511, 10521 constitute a rectangle whose normal line direction is perpendicular to the normal line direction of the plane formed by the ring portion of fixing frame 105.

Each of the fixing frame components 1041, 1042 comprises the half ring portion 10412, 10422, the frame sides 10411, 10421, the bearing portion 10414, 10424, and the half fixing holes 10415, 10425. The fixing frame component 1041 further comprises at least one alignment bump 10413, and the fixing frame component 1042 further comprises at least one alignment hole 10423 corresponding to at least one alignment bump 10413. The half fixing hole 10415 of the fixing frame component 1041 and the half fixing hole 10425 of the fixing frame component 1042 correspond to each other to form the fixing hole of fixing frame 104, wherein the half ring portions 10412 and 10422 form the ring portion of the fixing frame 104, and the alignment bump 10413 is formed on the corresponding half ring portion 10412 while the alignment hole 10423 is formed on the corresponding half ring portion 10422. The frame sides 10411 are connected to the two opposite ends of the corresponding half ring portion 10412, and the frame sides 10421 are connected to the two opposite ends of the corresponding half ring portion 10422. The bearing portion 10414 extends outward from one end of the corresponding frame sides 10411, and the bearing portion 10424 extends outward from one end of the corresponding frame sides 10421, wherein the two outward extending directions of the bearing portions 10414, 10424 are opposite and parallel to each other.

Further, the frame sides 10411 form a half rectangle, the two ends of the two opposite sides of the half rectangle are connected to the opposite ends of the corresponding half ring portion 10412, and the bearing portion 10414 is formed on the middle end of the other side of the half rectangle which is adjacent to the two opposite sides of the half rectangle. Similarly, the frame sides 10421 form a half rectangle, the two ends of the two opposite sides of the half rectangle are connected to the two ends of the corresponding half ring portion 10422, and the bearing portion 10424 is formed at the middle end of the other side of the half rectangle which is adjacent to the two opposite sides of the half rectangle. The frame sides 10411, 10421 constitute a rectangle whose normal line direction is perpendicular to the normal line direction of the plane formed by the ring portion of the fixing frame 104.

Each of the fixing frame components 1061, 1062 is annular, the fixing frame component 1061 is formed with a plurality of fixing holes 10612 of the fixing frame 106, and the fixing frame components 1061, 1062 form a ring portion of the fixing frame 106. The fixing frame component 1062 further comprises at least one alignment bump 10621, and the fixing frame component 1061 further comprises at least one alignment hole 10611 corresponding to the at least one alignment bump 10621. Please note that in other embodiments, the fixing frame component 1062 may also be formed with a plurality of fixing holes 10612 of the fixing frame 106. In short, the present disclosure is not limited thereto.

In addition, the spherical multi-axis optical fiber sensing device of the embodiment of the present disclosure can be applied to a movable device, therefore, the embodiment of the present disclosure also provides a movable device, and the movable device comprises a movable part, the aforementioned spherical multi-axis optical fiber sensing device and a control unit. The movable part is used to make the moveable device move and/or rotate, and the movable part can be at least one wheel, a jet or a propeller. The spherical multi-axis optical fiber sensing device is arranged inside the movable device and is used for sensing a motion signal of multiple axes. The control unit is signally connected to the spherical multi-axis optical fiber sensing device, and is used for receiving the motion signal, so as to control the movement and/or rotation of the movable element. The movable device is, for example, an unmanned aerial vehicle, a helicopter, a small civil aircraft, a robot, a ship, a vehicle, a ground drilling motion device, etc., and the present disclosure is not limited thereto.

Figure 6:
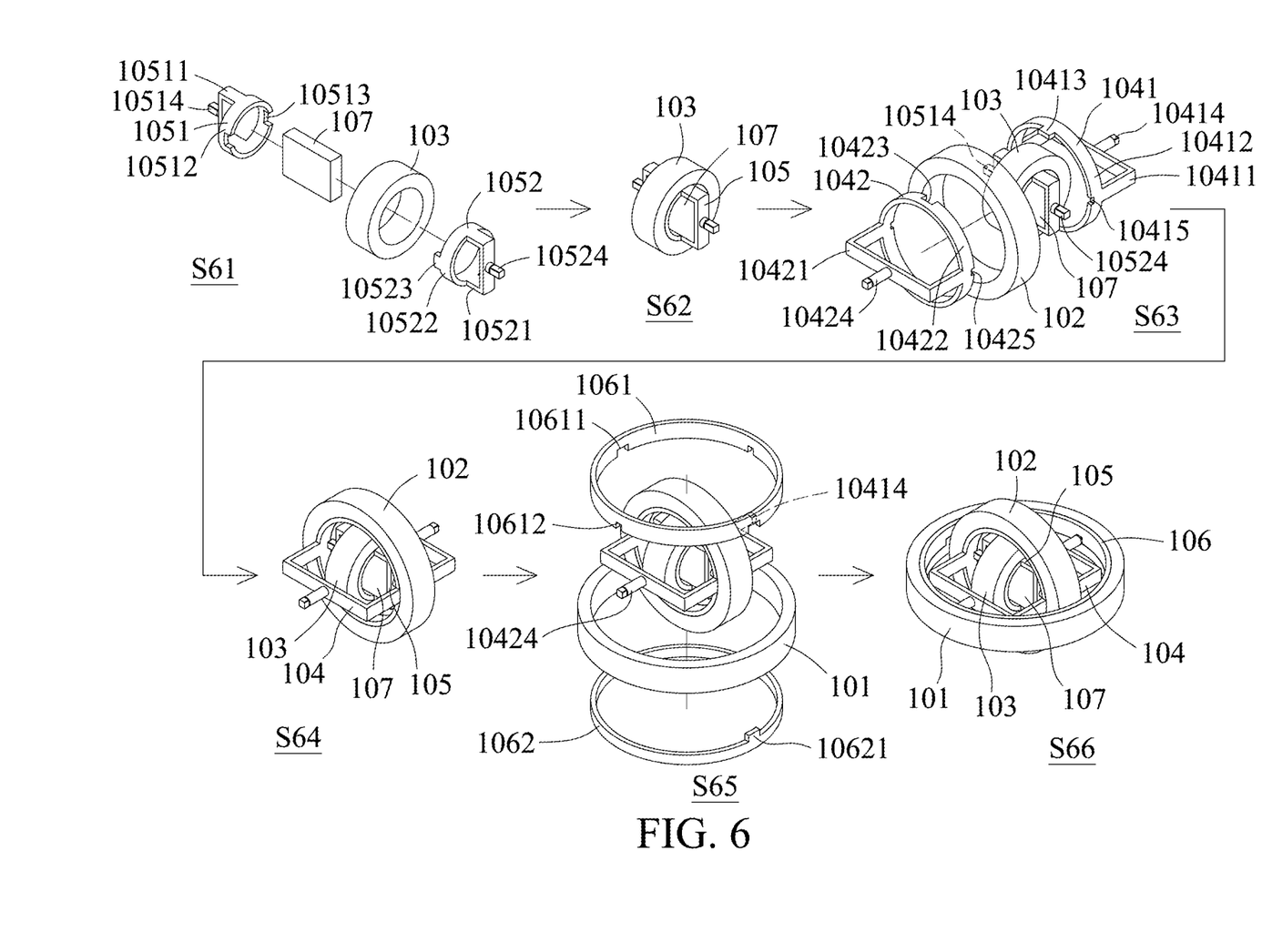
FIG. 6 is flow chart of an assembling method of a spherical multi-axis optical fiber sensing device according to an embodiment of the present disclosure.

Refer to FIG. 5 and FIG. 6 at the same time, and FIG. 6 is flow chart of an assembling method of a spherical multi-axis optical fiber sensing device according to an embodiment of the present disclosure. First, at step S61, two fixing frame components 1051, 1052, a fiber ring 103 and a transceiver module 107 as shown in FIG. 5 are provided. Next, at step S62, make the two fixing frame components 1051, 1052 move face by face to be sleeved in the fiber ring 103, and make the transceiver module 107 fixed within the fixing frame 105, wherein the two fixing frame components 1051, 1052 can form the fixing frame 105. Thus, ring portion of the fixing frame 105 is surrounded and contacted by the fiber ring 103, and the fiber ring 103 is fixed outside the fixing frame 105. The transceiver module 107 is surrounded and contacted by the frame sides 10511, 10521 of the fixing frame 105, such that the transceiver module 107 is fixed within the fixing frame 105. By the way, the transceiver module 107 may not be provided at step S61 and assembled at step S62. In one embodiment, after the fiber rings 101, 102, 103 and the fixing frames 104, 105, 106 are assembled, the transceiver module 107 is installed inside the fixing frame 105.

Next, at step S63, two fixing frame components 1041, 1042 and a fiber ring 102 as shown in FIG. 5 are provided. At step S64, put the assembled assembly of the fiber ring 103 and the fixing frame 105 into the fiber ring 102, make the normal line direction of the fiber ring 103 be perpendicular to the normal direction line of the fiber ring 102, and make the two fixing frame components 1041, 1042 move face by face to be sleeved in a fiber ring 102. Thus, the fixing frame components 1041, 1042 are combined to form the fixing frame 104. Accordingly, the fixing holes of the ring portion of the fixing frame 104 are used to receive the bearing portions 10514, 10524 of the fixing frame 105 to fix the fixing frame 105 within the fixing frame 104, and the fiber ring 102 surrounds and contacts the ring portion of the fixing frame 104, so as to be fix the fiber ring 102 outside the fixing frame 104.

Next, at step S65, two fixing frame components 1061, 1062 and the fiber ring 101 shown in FIG. 5 are provided. At step S66, put the assembled assembly of the fiber rings 103, 102 and the fixing frames 104, 105 into the fiber ring 101, make the normal line direction of the fiber ring 101 be perpendicular to the normal direction lines of the fiber rings 102, 103, and make the two fixing frame components 1061, 1062 move face by face to be sleeved in the fiber ring 101. Thus, the fixing frame components 1061, 1062 are combined to form the fixing frame 106. Accordingly, the fiber ring 101 surrounds and contacts the ring portion of the fixing frame 106, so as to be fix the fiber ring 101 outside the fixing frame 106.

In the prior art, the optical fiber sensor and the light integrating unit are first integrated into a single-axis optical fiber sensor, and then, multiple single-axis optical fiber sensors are assembled into a three-axis optical fiber sensor. However, the solution of the prior art has technical problems such as difficult three-axis concentricity, bulky volume, low measurement accuracy, and difficulty in mass production. However, according to the technical solution of the spherical multi-axis optical fiber sensing device provided by the embodiment of the present disclosure, only a single component photoelectric transceiver module is required to be arranged in the concentric center of the three fiber rings, and cooperate with the outer, middle, and inner three fiber rings and the fixing frames with the bearing portions, the spherical multi-axis optical fiber sensing device can be used as an orthogonal three-axis optical fiber sensor. Briefly, the embodiment of the present disclosure utilizes a single spherical multi-axis optical fiber sensing device to achieve the functional purpose that three sets of single-axis components are required to measure the three-dimensional information in the past. Its cost of materials used for the mechanism in the overall construction cost is expected to be greatly reduced by about 60%, the cost of optical fiber is expected to be reduced by 20%, the overall volume will be reduced by more than 64%, and the weight of the overall multi-axis sensor will be reduced by about 60%.

While the present disclosure has been described by way of example and in terms of preferred embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A spherical multi-axis optical fiber sensing device, comprising:

a first fiber ring;

a first fixing frame, having a ring portion being surrounded and contacted by the first fiber ring for fixing the first fiber ring outside the first fixing frame;

a second fixing frame, having a ring portion which has a plurality of fixing holes used for receiving a plurality of bearing portions of the first fixing frame, so as to fix the first fixing frame within the second fixing frame, wherein the ring portion of the first fixing frame is connected to the bearing portions of the first fixing frame;

a second fiber ring, surrounding and contacting the ring portion of the second fixing frame, so as to be fixed outside the second fixing frame;

a third fixing frame, having a ring portion which has a plurality of fixing holes used for receiving a plurality of bearing portions of the second fixing frame, so as to fix the second fixing frame within the third fixing frame, wherein the ring portion of the second fixing frame is connected to the bearing portions of the second fixing frame; and a third fiber ring, surrounding and contacting the ring portion of the third fixing frame, so as to be fixed outside the third fixing frame.

2. The spherical multi-axis optical fiber sensing device of claim 1, wherein three centers of the first fiber ring, the second fiber ring and the third fiber ring are concentric with each other, and three normal lines of the first fiber ring, the second fiber ring and the third fiber ring are perpendicular to each other.

3. The spherical multi-axis optical fiber sensing device of claim 2, wherein a first axial line of the bearing portions of the first fixing frame is parallel to the normal line of the first fiber ring, and a second axial line of the bearing portions of the second fixing frame is parallel to the normal line of the second fiber ring.

4. The spherical multi-axis optical fiber sensing device of claim 1, further comprising:

a transceiver module, surrounded and contacted by a plurality of frame sides of the first fixing frame, so as to be fixed within the first fixing frame, wherein the frame sides of the first fixing frame are connected to the ring portion of the first fixing frame, and the bearing portions of the first fixing frame extend outwardly from the frame sides.

5. The spherical multi-axis optical fiber sensing device of claim 4, wherein the transceiver module comprises a light integration unit, a light source, a detector and a logic circuit unit, wherein the logic circuit unit comprises an analog-to-digital chip unit, a digital logic operation chip, a field programmable gate array chip, a digital-to-analog chip unit and/or a hardware filter, and the light integration unit comprises an electro-optic phase modulation chip unit, an optical beam splitting unit, an optical waveguide light combining unit and/or a light polarization filter unit.

6. The spherical multi-axis optical fiber sensing device of claim 1, wherein the first fixing frame is formed by two corresponding first fixing frame components, the second fixing frame is formed by two corresponding second fixing frame components, and the third fixing frame is formed by two corresponding third fixing frame components.

7. The spherical multi-axis optical fiber sensing device of claim 6, wherein each of the first fixing frame components comprises a half ring portion, a plurality of frame sides and a bearing portion, one of the first fixing frame components further comprises at least one alignment bump, and other one of the first fixing frame components further comprises at least one alignment hole corresponding to the alignment bump, wherein the half ring portions form the ring portion of the first fixing frame, the alignment bump is formed on corresponding one of the half ring portions, and the alignment hole is formed on other corresponding one of the half ring portions, the frame sides of each of the first fixing frame components is are connected to two ends of the corresponding half ring portion, and each of the bearing portions extends outward from one end of the corresponding one frame side, wherein two extending directions which the bearing portions extending outward are opposite and parallel to each other.

8. The spherical multi-axis optical fiber sensing device of claim 6, wherein each of the second fixing frame components comprises a half ring portion, a plurality of frame sides, a bearing portion and a plurality of half fixing holes, one of the second fixing frame components further comprises at least one alignment bump, and other one of the second fixing frame components further comprises at least one alignment hole corresponding to the alignment bump, and the half fixing holes of one of the second fixing frame components and the half fixing holes of other one of the second fixing frame components correspond to each other to form the fixing holes of the second fixing frame, wherein the half ring portions form the ring portion of the second fixing frame, the alignment bump is formed on corresponding one of the half ring portions, and the alignment hole is formed on other corresponding one of the half ring portions, the frame sides of each of the second fixing frame components are connected to two ends of the corresponding half ring portion, and each of the bearing portions extends outward from one end of the corresponding one frame side wherein two extending directions which the bearing portions extending outward are opposite and parallel to each other.

9. The spherical multi-axis optical fiber sensing device of claim 6, wherein each of the third fixing frame components is annular, one of the third fixing frame components is formed with the fixing holes of the third fixing frame, the third fixing frame components are formed with the ring portion of the third fixing frame, one of the third fixing frame components further comprises at least one alignment bump, and other one of the third fixing frame components further comprises at least one alignment hole corresponding to the alignment bump.

10. A movable device, comprising:
a movable part, making the movable device move and/or rotate;
a spherical multi-axis optical fiber sensing device, disposed in the movable device, used to sense a motion signal of multiple axes, comprising:
a first fiber ring;
a first fixing frame, having a ring portion being surrounded and contacted by the first fiber ring for fixing the first fiber ring outside the first fixing frame;
a second fixing frame, having a ring portion which has a plurality of fixing holes used for receiving a plurality of bearing portions of the first fixing frame, so as to fix the first fixing frame within the second fixing frame, wherein the ring portion of the first fixing frame is connected to the bearing portions of the first fixing frame;
a second fiber ring, surrounding and contacting the ring portion of the second fixing frame, so as to be fixed outside the second fixing frame;
a third fixing frame, having a ring portion which has a plurality of fixing holes used for receiving a plurality of bearing portions of the second fixing frame, so as to fix the second fixing frame within the third fixing frame, wherein the ring portion of the second fixing frame is connected to the bearing portions of the second fixing frame; and
a third fiber ring, surrounding and contacting the ring portion of the third fixing frame, so as to be fixed outside the third fixing frame; and
a control unit, signally connected to the spherical multi-axis optical fiber sensing device for receiving the motion signal, so as to control movement and/or rotation of the movable part.

11. The movable device of claim 10, wherein three centers of the first fiber ring, the second fiber ring and the third fiber ring are concentric with each other, and three normal lines of the first fiber ring, the second fiber ring and the third fiber ring are perpendicular to each other.

12. The movable device of claim 11, wherein a first axial line of the bearing portions of the first fixing frame is parallel to the normal line of the first fiber ring, and a second axial line of the bearing portions of the second fixing frame is parallel to the normal line of the second fiber ring.

13. The movable device of claim 10, wherein the spherical multi-axis optical fiber sensing device further comprises:
a transceiver module, surrounded and contacted by a plurality of frame sides of the first fixing frame, so as to be fixed within the first fixing frame, wherein the frame sides of the first fixing frame are connected to the ring portion of the first fixing frame, and the bearing portions of the first fixing frame extend outwardly from the frame sides.

14. The movable device of claim 13, wherein the transceiver module comprises a light integration unit, a light source, a detector and a logic circuit unit, wherein the logic circuit unit comprises an analog-to-digital chip unit, a digital logic operation chip, a field programmable gate array chip, a digital-to-analog chip unit and/or a hardware filter, and the light integration unit comprises an electro-optic phase modulation chip unit, an optical beam splitting unit, an optical waveguide light combining unit and/or a light polarization filter unit.

15. The movable device of claim 10, wherein the first fixing frame is formed by two corresponding first fixing frame components, the second fixing frame is formed by two corresponding second fixing frame components, and the third fixing frame is formed by two corresponding third fixing frame components.

16. The movable device of claim 15, wherein each of the first fixing frame components comprises a half ring portion, a plurality of frame sides and a bearing portion, one of the first fixing frame components further comprises at least one alignment bump, and other one of the first fixing frame components further comprises at least one alignment hole corresponding to the alignment bump, wherein the half ring portions form the ring portion of the first fixing frame, the alignment bump is formed on corresponding one of the half ring portions, and the alignment hole is formed on other corresponding one of the half ring portions, the frame sides of each of the first fixing frame components are connected to two ends of the corresponding half ring portion, and each of the bearing portions extends outward from one end of the corresponding one frame side, wherein two extending directions which the bearing portions extending outward are opposite and parallel to each other.

17. The movable device of claim 15, wherein each of the second fixing frame components comprises a half ring portion, a plurality of frame sides, a bearing portion and a plurality of half fixing holes, one of the second fixing frame components further comprises at least one alignment bump, and other one of the second fixing frame components further comprises at least one alignment hole corresponding to the alignment bump, and the half fixing holes of one of the second fixing frame components and the half fixing holes of other one of the second fixing frame components correspond to each other to form the fixing holes of the second fixing frame, wherein the half ring portions form the ring portion of the second fixing frame, the alignment bump is formed on corresponding one of the half ring portions, and the alignment hole is formed on other corresponding one of the half ring portions, the frame sides of each of the second fixing frame components are connected to two ends of the corresponding half ring portion, and each of the bearing portions extends outward from one end of the corresponding one frame side, wherein two extending directions which the bearing portions extending outward are opposite and parallel to each other.

18. The movable device of claim 15, wherein each of the third fixing frame components is annular, one of the third fixing frame components is formed with the fixing holes of the third fixing frame, the third fixing frame components are formed with the ring portion of the third fixing frame, one of the third fixing frame components further comprises at least one alignment bump, and other one of the third fixing frame components further comprises at least one alignment hole corresponding to the alignment bump.

19. An assembling method of a spherical multi-axis optical fiber sensing device, comprising:
    making two first fixing frame components move face by face to be sleeved in a first fiber ring, such that the first fixing frame components form a first fixing frame, wherein a ring portion of the first fixing frame is surrounded and contacted by the first fiber ring, so as to fix the first fiber ring outside the first fixing frame;
    making an assembly assembled by the first fiber ring and the first fixing frame be disposed in a second fiber ring, and making a normal line direction of the first fiber ring be perpendicular to a normal line direction of the second fiber ring, making two second fixing frame components move face by face to be sleeved in the second fiber ring, such that the second fixing frame components form a second fixing frame, wherein a plurality of fixing holes of a ring portion of the second fixing frame is used to receive a plurality of bearing portions of the first fixing frame, such that the first fixing frame is fixed in the second fixing frame, the ring portion of the first fixing frame is connected to the bearing portions of the first fixing frame, and the second fiber ring surrounds and contacts the ring portion of the second fixing frame, so as to fix the second fiber ring outside the second fixing frame; and
    making an assembly assembled by the first fiber ring, the first fixing frame, the second fiber ring and the second fixing frame be disposed in a third fiber ring, making a normal line direction of the third fiber ring be perpendicular to the normal line direction of the first fiber ring and the normal line direction of the second fiber ring, making two third fixing frame components move face by face to be sleeved in the third fiber ring, such that the third fixing frame components form a third fixing frame, wherein a ring portion of the third fixing frame is surrounded and contacted by the third fiber ring, so as to fix the third fiber ring outside the third fixing frame.

20. The assembling method of claim 19, further comprising:
    making a transceiver module be surrounded and contacted by a plurality of frame sides of the first fixing frame, so as to fix the transceiver module within the first fixing frame, wherein the frame sides of the first fixing frame are connected to the ring portion of the first fixing frame.

\* \* \* \* \*